United States Patent [19]

Williams

[11] Patent Number: 4,699,710

[45] Date of Patent: Oct. 13, 1987

[54] SEPARATOR FOR PARTICULATES

[76] Inventor: Paul J. Williams, 489 Island Rd., Lunenburg, Mass. 01462

[21] Appl. No.: 705,614

[22] Filed: Feb. 26, 1985

[51] Int. Cl.⁴ .............................................. B07B 9/02
[52] U.S. Cl. ..................................... 209/24; 209/154; 209/250; 209/256; 209/305
[58] Field of Search ...................... 209/21, 24, 25, 32, 209/33, 134, 145, 135, 154, 241, 245, 250, 256, 258, 305, 306, 281, 44.2, 26, 27, 30, 31, 150, 22

[56] References Cited

U.S. PATENT DOCUMENTS

| | | | |
|---|---|---|---|
| 802,651 | 10/1905 | Meadon | 209/250 |
| 853,518 | 5/1907 | Osborne | 209/24 |
| 1,390,840 | 9/1921 | Sturtevant | 209/380 |
| 1,444,516 | 2/1923 | Moss | 209/135 |
| 1,660,682 | 2/1928 | Stebbins | 209/145 |
| 2,598,500 | 5/1952 | Burke | 209/134 |
| 3,975,263 | 8/1976 | Elo | 209/154 |
| 4,440,635 | 4/1984 | Reiniger | 209/306 |
| 4,477,339 | 10/1984 | Whaley et al. | 209/22 |

FOREIGN PATENT DOCUMENTS

| 108604 | 7/1967 | Denmark | 209/44.2 |
|---|---|---|---|
| 768558 | 2/1950 | United Kingdom | 209/138 |

Primary Examiner—Robert B. Reeves
Assistant Examiner—Donald T. Hajec
Attorney, Agent, or Firm—Blodgett & Blodgett

[57] ABSTRACT

Apparatus for separating relatively large particles from dust particles, comprising an enclosed separating station for separating the large particles from the dust particles. The large particle and dust particle mixture is pneumatically conveyed from a supply source to the separating station. The separated large particles and dust particles are conveyed from the separating station to respective depositories by respective pneumatic conveyors.

9 Claims, 3 Drawing Figures

SEPARATOR FOR PARTICULATES

BACKGROUND OF THE INVENTION

The present invention relates generally to apparatus for separating relatively large particles from dust particles or "fines". The invention relates particularly to apparatus for separating plastic resin dust or "fines" and plastic resin pellets from a mixture of dust and pellets.

In the plastic industry, resin is prepared by polymerization and extruding the polymerized resin into spaghetti-like strands. The strands are then cooled and chopped up into pellets for subsequent use in molding machinery and extrusion machinery for producing finished articles. During the pelletizing step, a great deal of plastic dust or "fines" is created. This dust is objectionable to the plastic industry and must be removed prior to shipping the resin pellets to the molding and extruding industry. At the present time, the dust is separated from the pellets by pouring the dust pellet mixture into a hopper and creating an air stream from the hopper which disperses the plastic dust. This creates a dust cloud about the hopped and the entire processing facility. The plastic dust creates a health hazard and this process is not totally effective in separating the dust from the pellets. In addition, the machinery which is being used at the present time to separate the dust from the pellets is extremely cumbersome and costly. Some of the dust and pellets are attached electrostatically and resists separation by the prior art devices. These and other difficulties experienced with the prior art devices have been obviated in a novel manner by the present invention.

It is, therefore, a principle object of the present invention to provide apparatus for separating large particles from dust particles in which the separated dust particles and large particles are positively controlled and conveyed to separate locations.

Another object of the invention is the provision of apparatus for separating large particles from dust particles in which the dust particles and large particles are agitated and dispersed within an enclosed space for more effective separation.

A further object of the present invention is the provision of apparatus for separating large particles and dust particles in which the dust particles and large particles are separated, conveyed and collected within a pneumatically sealed system, so that all of the dust particles are collected and pollution of the working environment is prevented.

It is a further object of the invention to provide apparatus for separating large particles from dust particles which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of apparatus for separating large particles from dust particles of a large particle and dust particle mixture. The apparatus comprises an enclosed separating station for separating the large particles from the dust particles. The mixture of large particles and dust particles is pneumatically conveyed from a supply source to the separating station. The separated dust particles and large particles are pneumatically conveyed to separate depositories.

More specifically, the separating station comprises a housing which contains a separating chamber, an inlet located at the top of the chamber, a first outlet located at the bottom of the chamber, and a second outlet located between the inlet and the first outlet. The large particle and dust particle mixture is conveyed to the inlet.

After separation of the large particles from the dust particles, the large particles pass to the first oulet and the dust particles pass to the second outlet.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
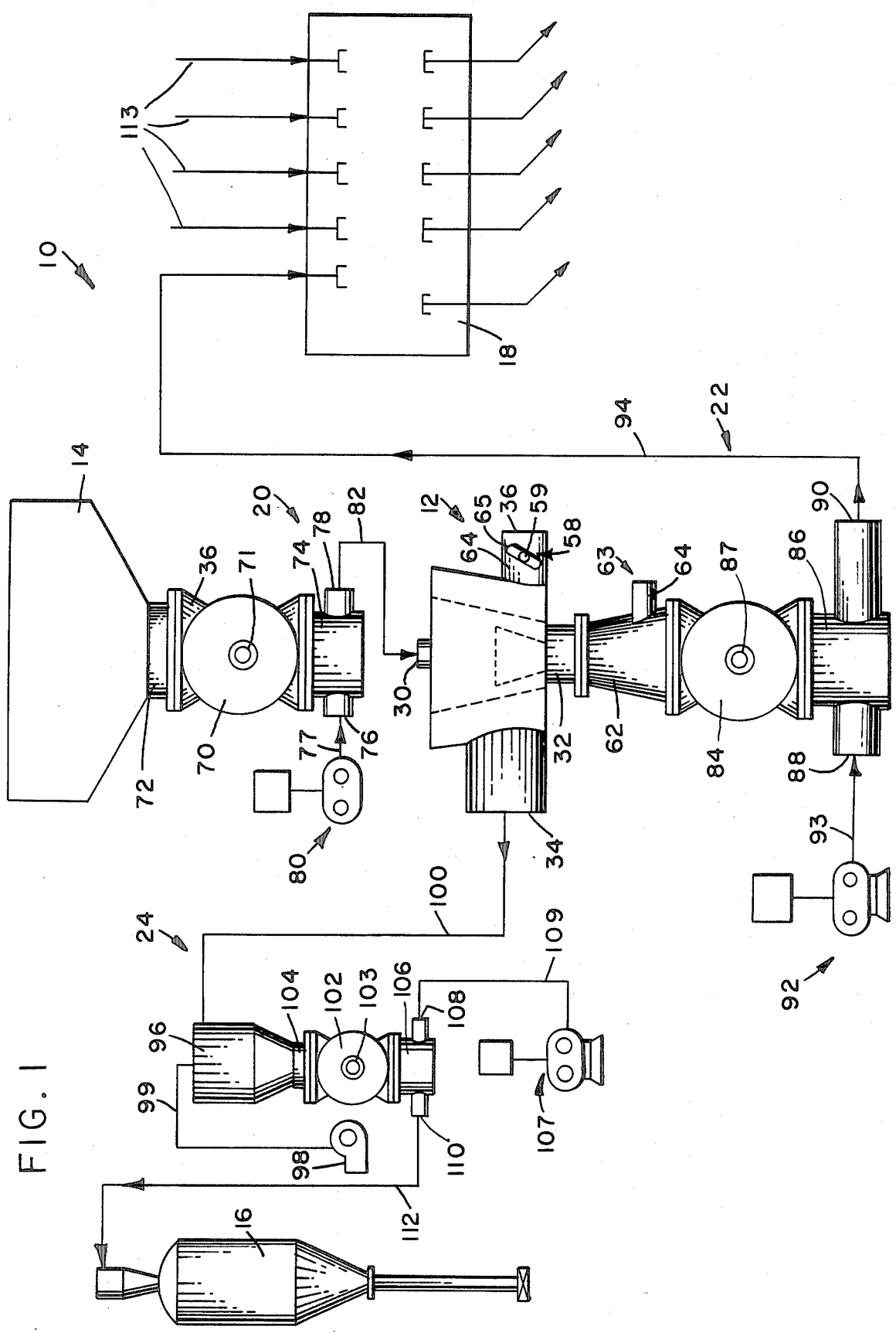
FIG. 1 is a diagrammatic view of a separating system embodying the principles of the present invention.

Referring first to FIG. 1, the separating system of the present invention is generally indicated by the reference numeral 10 and comprises a separating statio, generally indicated by the reference numeral 12. The separating system 10 also includes a supply source of particulate material such as a mixture of resin dust and resin pellets, a depository for the resin dust and depository for the resin pellets. The supply source is represented by silo 14, the depository for resin dust is represented by storage bin 16, and the depository for resin pellets is represented by loading station 18.

The resin pellet and resin dust mixture from the silo 14 is conveyed to the separating station 12 by means of a first pneumatic conveyor, generally indicated by the reference numeral 20. After separation of the dust from the pellets, the pellets are conveyed to the loading station 18 by means of a second pneumatic conveyor, generally indicted by reference numeral 22. The resin dust is conveyed to the storage bin 16 by a third pneumatic conveyor, generally indicated by the reference numeral 24.

Figure 2:
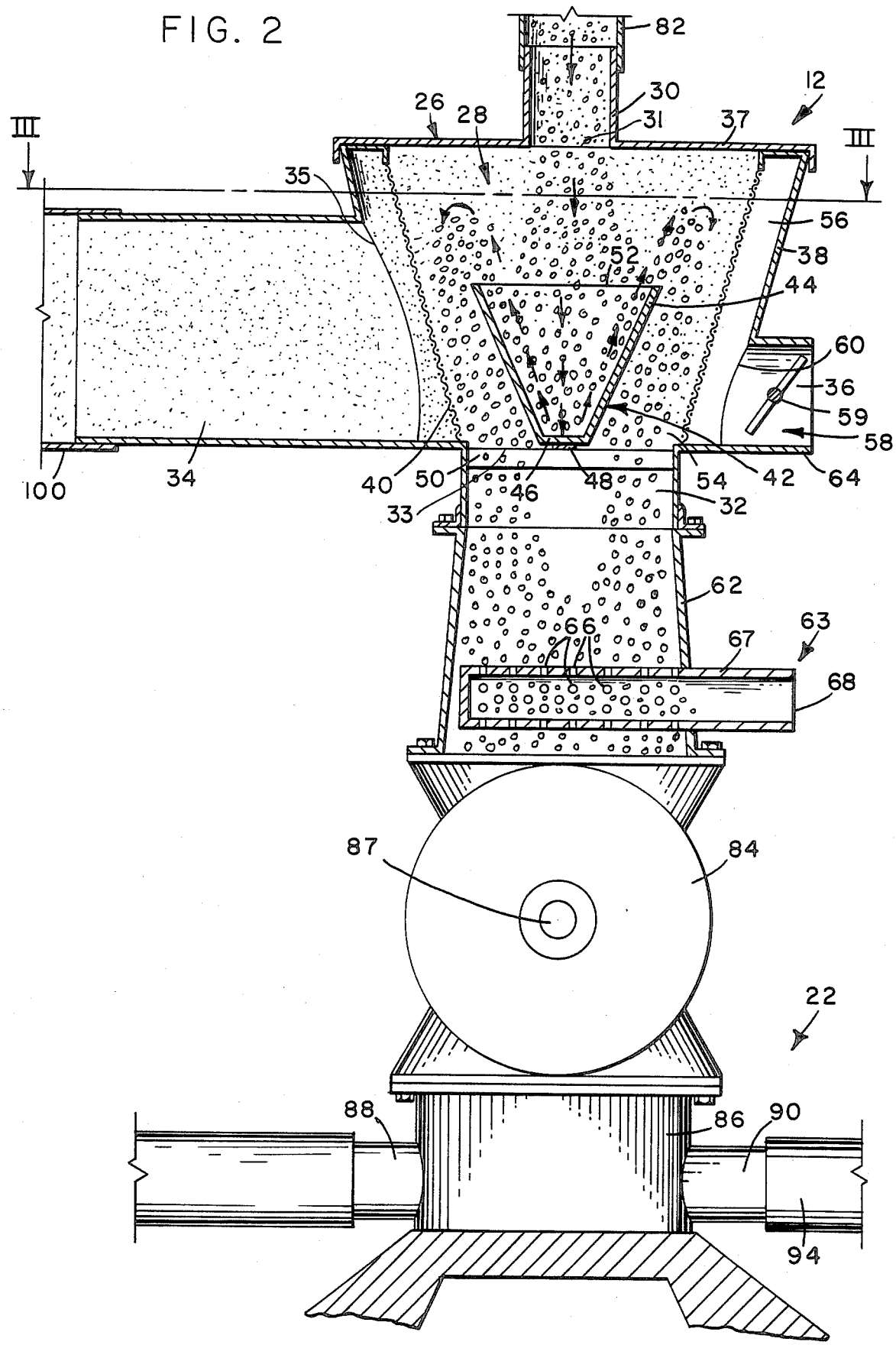
FIG. 2 is a vertical cross-sectional view of the separating station.

Referring also to FIG. 2, the separating statio 12 comprises an enclosed housing 26 which contains a separating chamber, generally indicated by the reference numeral 28. The housing 26 comprises a top wall 37 and a frusto-conical side wall 38. An inlet passage 30 extends upwardly from an inlet opening 31 in the top wall 37 of the housing 36. and communicates with the chamber 28. A first outlet passage 32 extends from a first outlet opening at the bottom of the housing and also communicates with the chamber 28. A second outlet 34 extends laterally from a second outlet opening 35 in the side wall 38 of the housing. A vent opening 36 is located on the opposite side of the housing 26 and is diametrically opposed to the second outlet passage 34. A cup-shaped agitator, generally indicated by the reference numeral 42 is located within the separating chamber 28 and consists of a bottom wall 46 and a frusto-conical side wall 44 which extends upwardly and outwardly from the bottom wall 46 to a top opening 52. The agitator 42 is supported on a support bar 48 which is in turn supported on a pair of cross bard 50 which extends across the first outlet passage 32. A frusto-conical screen 40 is also located in the separating chamber 28 between the side wall 38 of the housing and the agitator 42, so as to define an annular space 54 between the agitator and the screen and an annular space 56 between the screen and the side wall 38 of the housing. The screen is thereby located between the agitator 42 and the opening 39 to the second outlet passage 34 as shown in FIG. 2. An airflow control valve, generally indicated by the reference numeral 58, is located at the vent opening 36. The valve 58 is located within a cylindrical tubular pipe 64 which extends from the vent opening 36. The valve 58 comprises a disc shaped planar damper 60 which is pivotally mounted within the pipe 64 by means of a shaft 59. The shaft 59 extends ouside of the pipe 64 and is attached to an operating handle 65. The first outlet chamber 32 32 includes a lower extension 62 which contains a secondary vent generally indicated by the reference numeral 63. The secondary vent 63 includes a tubular pipe 67 which extends into the interior of the extension portion 62 of the first outlet, and contains a plurality of small apertures 66. One end of the pipe extends outside of the extension 62 and has an opening 68 which opens to the atmosphere.

The first pneumatic conveyor 20 comprises an airlock metering valve 70 which is located between an upper hollow fixture 72 and a lower hollow fixture 74. The air lock metering valve 70 is a standard commercially available metering valve which is pneumatically sealed between the upper and lower fixtures 72 and 74, respectively. The air lock metering valve which has been used as part of the present invention is sold under the tradename AEROLOCK Model "HD" by Premier Pneumatics, Inc. of Salina, Kansas. The valve 70 is effective to mechanically convey the pellet, dust mixture from the supply silo 14 to the fixture 74 while maintaining an air seal between the upper and lower fixtures 72 and 74, respectively. The valve 70 includes a drive shaft 71 which is driven by conventional drive means, now shown. The lower fixture 74 includes an inlet 76 and an outlet 78. Pneumatic pumping means, generally indicated by the reference numeral 80, delivers pressurized air to the inlet 76 by means of an air line. This pressurized air conveys the pellet, dust mixture from the inlet 74 to the inlet 30 of the separating station 12 by means of a tubular air line 82.

The second pneumatic conveyor 22 includes an air lock metering valve 84 which is located between the extension 62 and a hollow fixture 86. The fixture 86 includes an inlet 88 and an outlet 90. The metering valve 84 is identical to the valve 70 and includes a drive shaft 87 which is driven by conventional drive means, not shown. Pumping means, generally indicated by the reference numeral 92, introduces pressurized air into the fixture 86 through the inlet 88 by means of an air line. The pressurized air within the fixture 86 causes the resin pellets which are separated by the separated station 12 to be are conveyed from the fixture 86 to the loading station 18 through an air line 94.

The third pneumatic conveyor 24 comprises a cyclone collector 96. The collector 96 is a standard commercially available collector which includes an enclosed collection chamber which is maintained under subatmospheric pressure by means of a vacuum pump 98 which is connected to the cyclone collector 96 by means of an air line 99. An air line 100 connects the second outlet 34 to the cyclone collector 96, so that the second outlet 34 is maintained under subatmospheric pressure. The dust which is separated from the dust pellet mixture within the separating station 12 is drawn into the cyclone collect6or 96 and drawn into a cyclone within the collector 96, whereby the dust eventually settles at the base of the collector and into a hollow fixture 104. An air lock valve 102 is located between the fixture 104 and a hollow fixture 106. The fixture 106 has an inlet 108 and an outlet 110. The air lock valve 102 is similar to air lock valves 70 and 84 and includes a drive shaft 103 which is rotated by drive means, not shown. The air lock valve 102 is pneumatically sealed with respect to the fixtures 104 and 106 and is effective to meter resin dust mechanically from the fixture 104 into the fixture 106. Pneumatic pumping means 107 is connected to the inlet 108 by means of an air line 109 and is effective to pressurize the interior of the fixture 106. The superatmospheric air from the fixture 106 is effective to carry the dust from the outlet 110 to the storage bin 16 by an air line 112.

Figure 3:
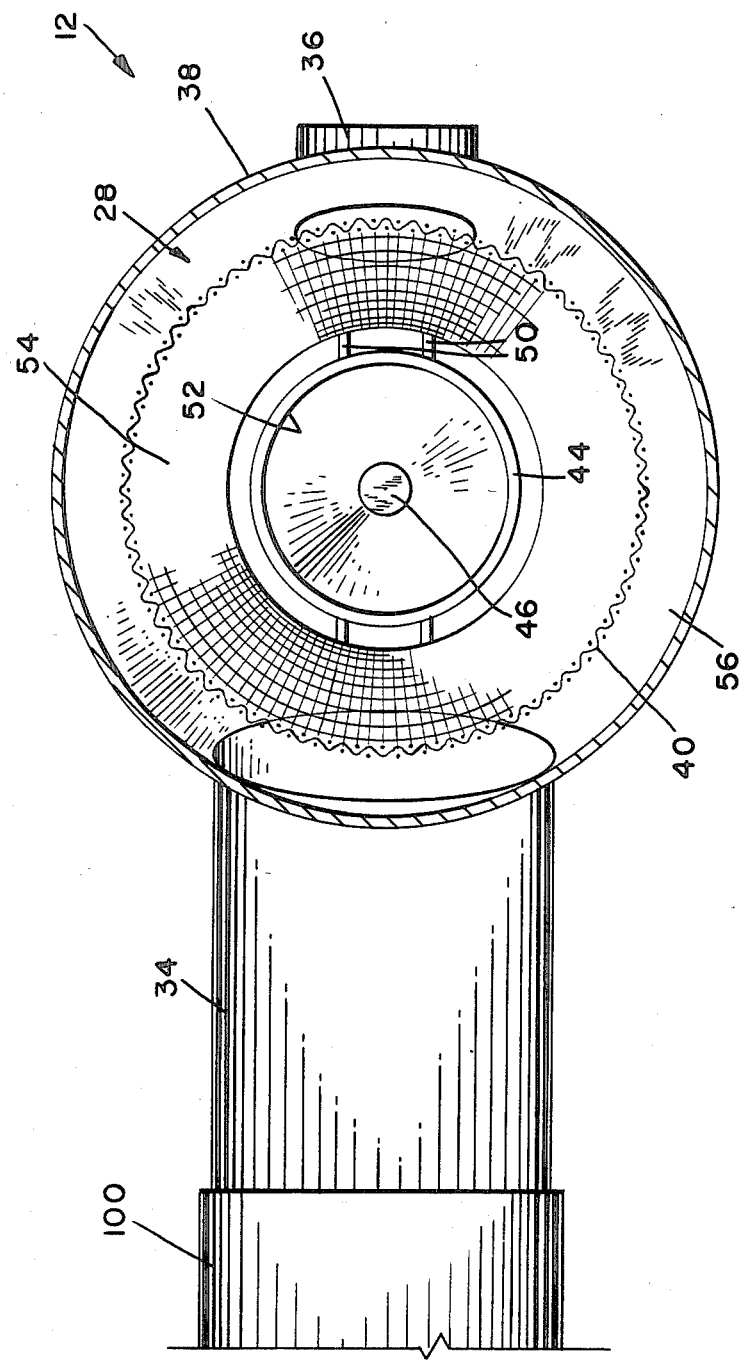
FIG. 3 is a horizontal sectional view of the separating station, taken along the line III—III of FIG. 2.

The operation and advantages of the present invention will now be readily understood in view of the above description. Referring particularly to FIG. 1, the mixture of resin pellets and resin dust is continuously metered from the supply silo 14 by the valve 70 into the fixture 74. The pellet, dust mixture is then delivered to the inlet passage 30 through the airl ine 32 by means of the superatmospheric air flow which is created by the pumping apparatus 80. Referring also to FIGS. 2 and 3, the pellet, dust mixture enters the chamber 28 through the inlet 31 at substantial superatmospheric pressure. The pressure drops substantially within the chamber 28. However, the pellet, dust mixture has sufficient impetus as it enters the chamber 28, so that it enters the interior of the agitator 42 with sufficient velocity to strike the bottom wall 46 and rebound upwardly along the frusto-conical shaped side wall 44. The pellet dust mixture is, thereby, dispersed and expanded into a lower spatial density within the portion of chamber 28 which is enclosed by the screen 40. The subatmospheric pressure in the second outlet passage 34 draws atmospheric air through the vent opening 36 and creates an air flow across the separating chamber 28. This transverse air flow carries the resin dust within the space which is enclosed by the screen 40 and carries it through the screen into the annular space 56 and through the second outlet opening 35 to the second outlet passage 34. The mesh of the screen 40 is such that the dust particles are allowed to pass through the screen, but the resin pellets are prevented from passing therethrough. The dust is then conveyed under subatmospheric pressure through the air line 100 to the cyclone collector 96. The dust is then metered by the air lock valve 102 from the collector 96 into the fixture 106. The dust is finally conveyed under superatmospheric pressure from the fixture 106 through the air line 112 into the storage bin 16. Although most of the air is drawn from the vent opening 36, some air is drawn upwardly from the secondary vent 63 as a final separating operation for any resin dust which may have drifted down into the first outlet 32. The relative airflow between the vent opening 36 and the secondary vent 63 can be controlled by the valve 58. The valve 58 can also be used to balance the pressures and relative airflows of the separating station 12. The first outlet 32 can be perodically purged of dust by adjusting the damper 60 to the completely closed position, so that all airflow is upwrdly through the first outlet 32 from the secondary vent 63 to the second outlet 34.

The separated resin pellets are metered from the extension 62 into the hollow fixture 86. The pellets are then conveyed under superatmospheric pressure from the fixture 86 through the air line 94 and into the loading station 18. Resin from additional separating units, not shown, is also delivered to the loading station 18 through additional air lines 113. The loading station 18 is a conventional state-of-the-art station from which the resin is deposited into containers for shipment to the end users, such as the plastic molding industry. The storage bin 16 is also adapted to receive resin dust from several separating stations. The collected dust is thereafter collected and recycled. Since the resin, dust mixture is driven into the agitator 42 with sufficient force to cause the mixture to rebound after striking the interior surface of the agitator. This action causes electrostatically bound dust and pellets to separate long enough for the dust to be drawn into the transverse air flow through the chamber 28, thereby allowing the dust free resin pellets to fall through the first outlet opening 33 into the first outlet passage 32.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Separating apparatus for separating relatively large particles from dust particles of a mixture of large particles and dust particles, said apparatus comprising:
   (a) an enclosed separating station for separating large particles from dust particles, said separating station having a housing which includes a top wall and a continuous annular side wall which define a separating chamber, an inlet opening in said top wall, a first outlet opening at the bottom of said chamber, and a second outlet opening in said side wall, said separating station being effective to separate large particles from dust particles of a mixture of large particles and dust particles so that the large particles pass to said first outlet opening and the dust particles pass to said second outlet opening,
   (b) a first pneumatic conveying means for conveying a mixture of large particles and dust particles under superatmospheric pressure to said inlet opening so that said mixture enters said chamber with impetus,
   (c) a second pneumatic conveying means for conveying said large particles from said first outlet opening, and
   (d) a third pneumatic conveying means for conveying said dust particles from said second outlet opening under subatmospheric pressure and for creating an airflow, within said chamber toward said second outlet opening, said separating station comprising:
      (1) a cup-shaped agitator which has an opening which faces said inlet opening, said agitator being located within the separating chamber for agitating said large particles and dust particle mixture so that the mixture is dispersed through the separating chamber, threby expanding the mixture to a lower spatial density and increasing the exposure time of said mixture to said airflow, and
      (2) a screen which is located in said separating chamber between said second outlet opening and said agitator and which circumscribes said agitator so that there is an annular space between the agitator and the screen, and there is an annular space between said annular side wall and said screen, said screen being effective to allow said dust particles to pass through the screen with the airflow to said second outlet opening and to prevent said large particles from passing through the screen,
   (e) a vent opening in said annular side wall, said vent opening being diametrically opposed to said second outlet opening and open to the atmosphere,
   (f) an air valve at said vent opening for regulating the airflow between the vent opening and the second outlet,
   (g) an air lock metering valve between said first outlet opening and said second pneumtaic means which is effective to maintain an air seal between the second conveyor and the first outlet opening while allowing said large particles to pass from said first outlet opening to said second conveyor, and
   (h) a secondary vent which is located below said second outlet opening and said vent opening, said secondary vent being a perforated tube which is located between said first outlet opening and said metering vale, one end of said perforated tube being open to the atmosphere.

2. Separating apparatus for separating relatively large particles from dust particles of a mixture of large particles and dust particles, said apparatus comprising:
   (a) an enclosed separating station for separating large particles from dust particles, said separating station having a housing which includes a top wall and a continuous said wall which define a separating chamber, an inlet opening in said top wall, a first outlet opening at the bottom of said chamber, a second outlet opening in said side wall at one side of said chambe, and a vent opening is located at the opposite side of said chamber and open to the atmosphere, said separating station being effective to separate large particles from dust particles of a mixture of large particles and dust particles so that the large particles pass to said first outlet opening and the dust particles pass to said second outlet opening,
   (b) a first pneumatic conveying means for conveying a mixture of large particles and dust particles under superatmospheric pressure to said inlet opening so that said mixture enters said chamber with impetus,
   (c) a second pneumatic conveying means for conveying said large particles from said first outlet opening, and
   (d) a third pneumatic conveying means for conveying said dust particles from said second outlet opening udner subatmospheric pressure and for creating an airflow within said chamber toward said second outlet opening, said separating station comprising:
      (1) a cup-shaped agitator which has an opening which faces said inlet opening, said agitator being located within the separating chamber for receiving and disrupting the flow of said large particles and dust particles mixture and for agitating said mixture so that the mixture is dispersed with the separating chamber, thereby expanding the mixture to a lower spatial density and increasing the exposure time of said mixture to said airflow,
  (2) a screen which is located in said separaring chamber between said second outlet opening and said agitator, said screen being effective to allow said dust particles to pass through the screen with the airflow to said second outlet opening and to prevent said large particles from passing through the screen,
(e) a metering valve hich is located between said first outlet opening and said second pneumatic means, said metering valve being an air lock metering valve which is effective to maintain an air seal between the second conveyor and the first outlet opening while allowing said large particles to pass from said first outlet opening to said second conveyor, and
(f) a secondary vent which is located below said second outlet opening and said vent opening, said secondary vent being a perforated tube which is located between said first outlet opening and said metering valve, one end of said perforated tube being open to the atmosphere.

3. Separating apparatus as recited in claim 2, wherein said second pneumatic conveying means is at superatmospheric pressure.

4. Separating apparatus as recited in claim 2, wherein said agitator is frusto-conical with the opening of said agitator representing the base of the cone.

5. Separating apparatus as recited in claim 2, wherein said screen is annular and circumscribes said agitator so that there is an annular space between the agitator and the screen.

6. Separating apparatus as recited in claim 5, wherein said side wall is annular and there is an annular space between said annular side wall and said screen.

7. Separating apparatus as recited in claim 6, wherein the annular side wall and the screen are each frusto-conical with the larger diameter of the cone being at the top.

8. Separating apparatus as recited in claim 2, wherein an air valve is located in said vent opening for regulating the airflow between the vent opening and the second outlet.

9. Separating apparatus as recited in claim 8, wherein said air valve comprises:
  (a) an open ended pipe which extends from said housing,
  (b) a planar damper which is pivotally mounted within said pipe, and
  (c) a handle which is located outside of said pipe and which is operatively connected to said damper for controlling the position of the damper within the pipe.

* * * * *